United States Patent [19]

Gysel et al.

[11] Patent Number: 5,402,489
[45] Date of Patent: Mar. 28, 1995

[54] SCRAMBLED VIDEO SIGNAL TRANSMISSION SYSTEM WITH PULSE-CODE MODULATED SUBCARRIER

[75] Inventors: Hermann Gysel, San Jose, Calif.; Wilton J. Hildenbrand, Jr., Smithtown, N.Y.

[73] Assignee: Synchronous Communications, Inc., San Jose, Calif.

[21] Appl. No.: 951,389

[22] Filed: Sep. 25, 1992

[51] Int. Cl.⁶ ............................................. H04N 7/167
[52] U.S. Cl. ......................................... 380/15; 380/20
[58] Field of Search ...................... 380/12, 13, 10, 15, 380/20

[56] References Cited

U.S. PATENT DOCUMENTS

| | | | |
|---|---|---|---|
| 4,079,419 | 3/1978 | Siegle et al. | 358/193 |
| 4,275,416 | 6/1981 | Dieterich | 358/147 |
| 4,951,313 | 8/1990 | Gysel | 380/10 |
| 5,136,641 | 8/1992 | Gysel | 380/15 |

*Primary Examiner*—Gilberto Barron, Jr.
*Attorney, Agent, or Firm*—Fliesler, Dubb, Meyer & Lovejoy

[57] ABSTRACT

A scrambled frequency modulated video signal transmission system is provided with a headend station having a d.c. coupled amplitude demodulator for removing the amplitude modulation of a scrambled amplitude modulated baseband video signal. The low frequency components, e.g. 0–50 Hz, of the resulting scrambled baseband video signal are separated from the remaining high frequency components thereof for providing a pulse-code FSK modulated subcarrier. The subcarrier and the high frequency components are then combined and frequency modulated in a frequency modulator. The resulting scrambled frequency modulated video signal is then transmitted via fiber optic, coaxial and/or microwave transmission lines to a frequency demodulator in a hub station. In the hub station the output of a frequency demodulator is provided to a subcarrier demodulator for removing the pulse-code FSK modulated subcarrier producing the low frequency components, e.g. 0–50 Hz, which contain the scrambled sync pulse information. The resulting signals are then combined with the high frequency components thereof and provided to a d.c. coupled amplitude modulator before being transmitted to a TV set. In the TV set the output of the amplitude modulator is then provided to a descrambler. The descrambler restores the sync pulse information to the amplitude modulated video signal. The amplitude modulated video signal is then provided to an amplitude demodulator for restoring the original baseband video signal.

47 Claims, 7 Drawing Sheets

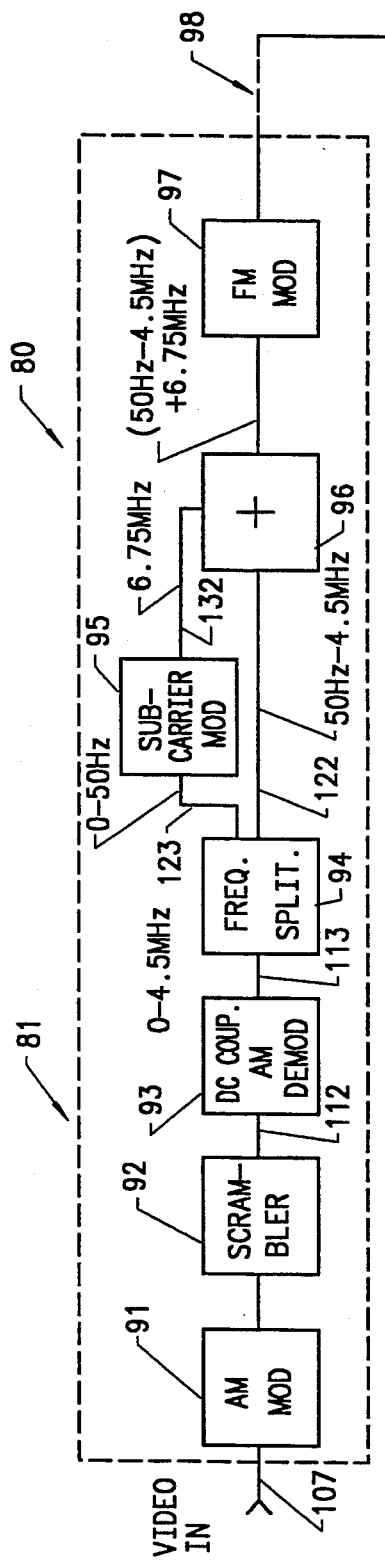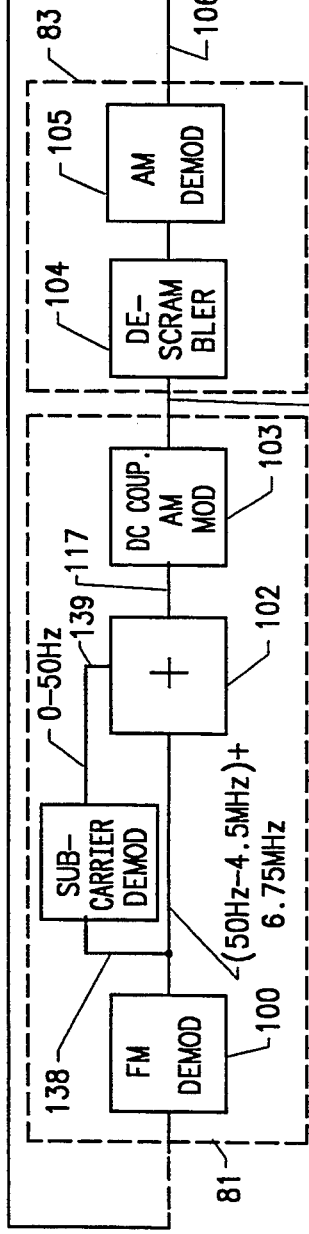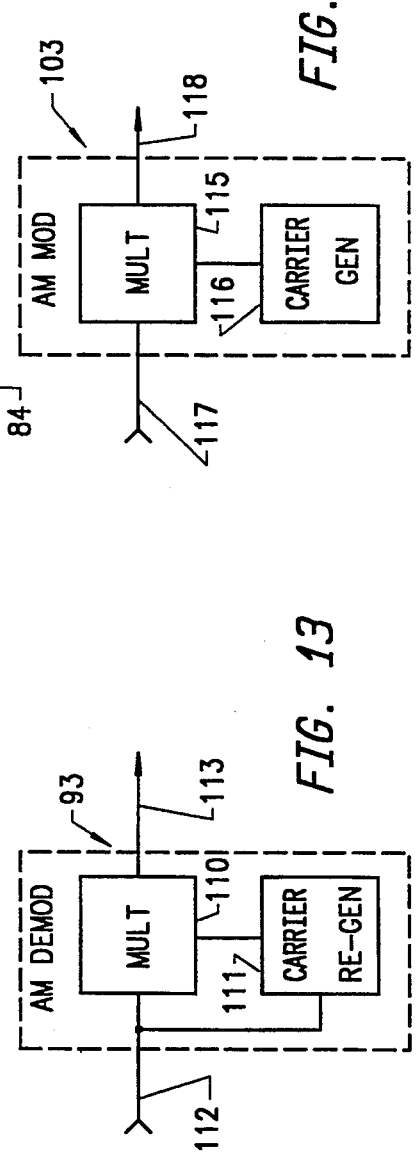
FIG. 12
FIG. 13
FIG. 14

SCRAMBLED VIDEO SIGNAL TRANSMISSION SYSTEM WITH PULSE-CODE MODULATED SUBCARRIER

BACKGROUND OF THE INVENTION

1. Field of the Invention

The present invention relates to television (TV) signal transmission systems in general and in particular to an apparatus and method for transmitting scrambled video signals over a frequency modulated (FM) signal link using a pulse-code modulated frequency shift keyed (FSK) subcarrier in a cable TV (CATV) system.

2. Description of the Related Art

A typical CATV system comprises a headend station and, depending on its size, one or more hub stations for transmitting TV signals to the homes, offices, and the like, of individual subscribers.

A headend station is defined as a source of TV signals. The signals are typically transmitted from the headend station to the hub stations via fiber optic, coaxial and/or microwave transmission lines. The signals are transmitted from a hub station, usually by means of coaxial transmission lines, to the TV sets of individual subscribers and, in the case of large CATV systems, to other hub stations for distribution to its subscribers.

Conventional TV sets are designed to receive amplitude modulated (AM) video signals. The transmission of AM signals, however, suffers from poor performance due to decreasing signal-to-noise ratios which can become unacceptable over long transmission lines, e.g. longer than 5-10 kilometers.

To compensate for the signal-to-noise problem where long transmission lines exist between a headend station and a hub, a common practice has been to transmit FM video signals between the two. As is well known, such signals have a very high signal-to-noise ratio. When received in the hub, the signals are demodulated and then amplitude modulated for transmission to the TV sets connected thereto.

The scrambling of video signals is used in CATV systems to prevent the unauthorized viewing of certain TV programs or channels. While various methods may be used for scrambling a video signal, the most common method currently in use involves suppression of the video sync pulse in an amplitude modulated baseband video signal. In the TV set, sync circuits which are responsive to the sync pulse are used for synchronizing the TV to the transmitted video. If the sync pulse is suppressed, a descrambler is required in order to restore the pulse to the AM signal.

In systems providing scrambled video signals which must be transmitted over long distances, e.g. longer than 5-10 kilometers, FM signal processing has been used in an attempt to compensate for the reduced signal-to-noise ratios encountered. In practice, however, since the resulting FM modulation is actually a modulation within a modulation, the use of FM to compensate for the adverse effects on the signal-to-noise ratio resulting from the AM modulation required for scrambling is found to be inadequate.

In U.S. Pat. No. 4,951,313 there is disclosed a video signal transmission system which takes advantage of FM modulation while avoiding the disadvantages of an amplitude modulation within a frequency modulation by demodulating the AM video signal after it has been scrambled but before it is used to provide a frequency modulated video signal. Specifically, in the patented system, the low frequency components, e.g. 0-50 Hz, which contain the sync pulse information are used to pulse-width modulate a frequency shift keyed (FSK) subcarrier having a nominal frequency of 6.75 MHz. The pulse-width modulated FSK subcarrier and the remainder of the scrambled baseband video signal are then combined and used to provide the frequency modulated video signal. It was found, however, that the use of pulse-width modulation of the subcarrier has led to instabilities in the demodulated video signals under certain circumstances.

Specifically, it was found that phase and amplitude noise in the signal transmission link was being demodulated in the FSK demodulation circuit in the receiver such that there was a superposition of the transmitted signal and the demodulated noise which caused amplitude noise, and jitter in the pulse-width modulated signal transitions at the output of the FSK demodulator. It was also found that the following integrator, i.e. the following RC circuit, used for demodulating the pulse-width modulated signal at the output of the FSK demodulator only partially suppressed the noise and jitter.

SUMMARY OF THE INVENTION

For the foregoing reasons, a principal object of the present invention is a scrambled frequency modulated video signal transmission system of the type described in U.S. Pat. No. 4,951,313, which uses pulse-code modulated (PCM) subcarrier signals to overcome the above-described problems associated with phase noise in the video link and thereby provide an improved and more stable video signal. For example, the use of pulse-code modulated subcarrier signals is found to improve stability by a factor of 10, thus providing a significant improvement in the quality of the received video, which should also lead to improved signal processing in a digital format.

In accordance with the above object, there is provided an amplitude demodulator for removing the amplitude modulation from a conventionally scrambled amplitude modulated video signal producing what is conveniently called a scrambled baseband video signal, or simply scrambled baseband. The low frequency components, e.g. 0-50 Hz, of the scrambled baseband video signal, which contain scrambled sync pulse information are then removed from the baseband signal and used for providing a pulse-code FSK modulated subcarrier. The pulse-code FSK modulated subcarrier and the remainder of the scrambled baseband video signal are then combined and frequency modulated to produce a scrambled frequency modulated video signal. The scrambled frequency modulated video signal is then transmitted via fiber optic, coaxial or microwave transmission lines to a hub. In the hub, the scrambled FM video and the pulse-code FSK modulated subcarrier are demodulated, restoring the scrambled baseband video. The scrambled baseband video is then amplitude modulated and thereafter transmitted to the TV sets of subscribers wherein it is descrambled and demodulated to produce the original baseband video signal.

By removing the amplitude modulation from the video signal and placing the scrambled sync pulse information on a pulse-code FSK modulated subcarrier before the video signal is transmitted, a high signal-to-noise ratio and the necessary sync pulse information required by the TV set is preserved while at the same time a high quality, stable video signal is provided.

BRIEF DESCRIPTION OF THE DRAWINGS

The above and other objects, features and advantages of the present invention will become apparent from the following detailed description of the accompanying drawings, in which:

FIG. 12 is a block diagram of a transmission system for transmitting scrambled frequency modulated video signals according to the present invention;

FIG. 13 is a block diagram of an amplitude demodulator in accordance with the present invention;

FIG. 14 is a block diagram of an amplitude modulator according to the present invention;

DESCRIPTION OF THE PREFERRED EMBODIMENTS

Figure 1:
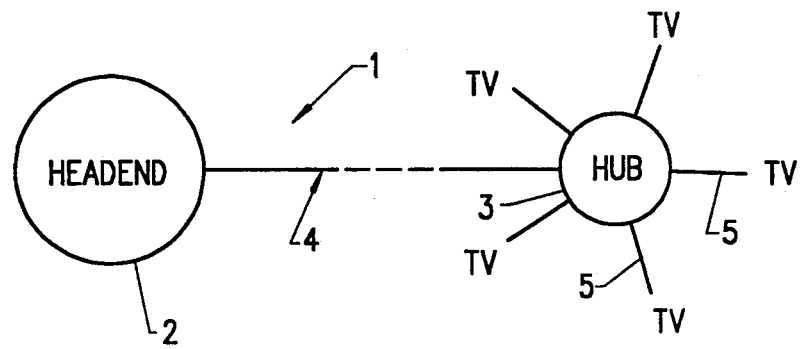
FIG. 1 is a diagram of a conventional CATV system comprising a headend station and one hub station.

Referring to FIG. 1, there is provided a typical cable TV (CATV) system designated generally as 1. In the system 1 there is provided a headend station 2 and a hub station 3. The hub station 3 is coupled to the headend station 2 in a typical system by fiber optic, coaxial and/or microwave transmission lines designated generally as 4. A plurality of television (TV) sets are coupled to the hub station 3, usually by means of a plurality of coaxial transmission lines designated generally as 5.

In practice, the headend station 2 is the source of television programs. The programs are transmitted over the line 4 to the hub station 3. From the hub station 3 the television programs are distributed to the individual TV sets connected thereto by the lines 5.

Figure 2:
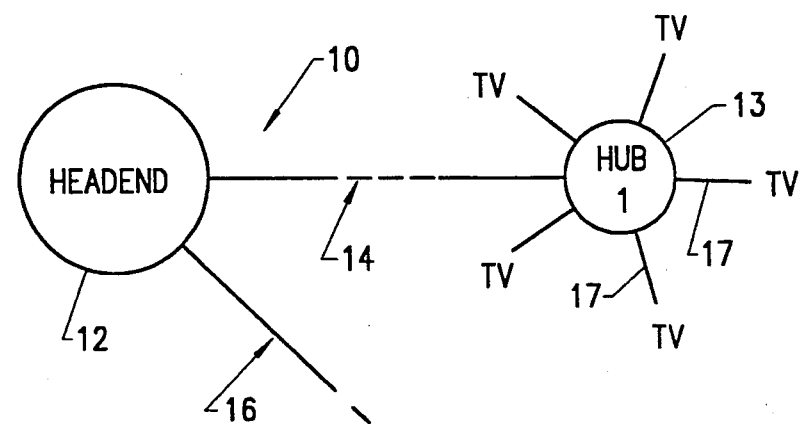
FIG. 2 is a diagram of a conventional CATV system comprising a headend station and two hub stations.
Figure 2:
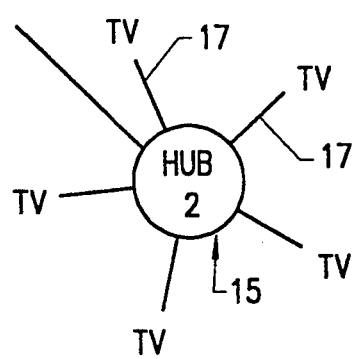

Referring to FIG. 2, there is provided in another video signal transmission system designated generally as 10 a headend station 12. A first hub station 13 is coupled to the headend station 12 by means of a fiber optic, coaxial and/or microwave transmission line 14 and a second hub station 15 is coupled to the headend station 12 by means of a fiber optic coaxial and/or microwave transmission line 16. As in the system of FIG. 1, hub stations 13 and 15 distribute television programs received from the headend station 12 to individual TV sets by means of a plurality of coaxial transmission lines 17.

In CATV systems wherein the transmission lines are relatively short, e.g. less than 5 to 10 kilometers in length, conventional amplitude modulated (AM) video signals are transmitted by the headend stations to the hub stations and from the hub stations to the individual television sets. However, when the transmission lines between the headend station and the individual television sets exceeds 5 to 10 kilometers in length, the signal-to-noise ratio of conventional amplitude modulated video signals is too low, requiring that the signals be transmitted in a form with a higher signal-to-noise ratio. In such cases frequency modulation and/or digital signal processing is typically used to provide an increased signal-to-noise ratio.

Figure 3:
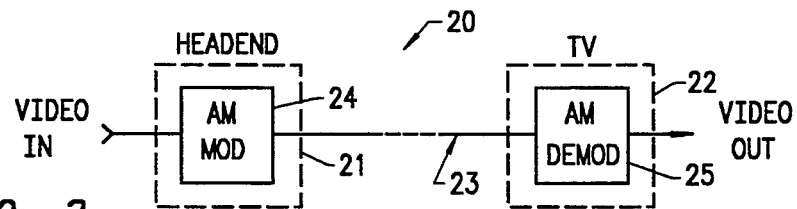
FIG. 3 is a simplified block diagram of a conventional video signal transmission system for transmitting unscrambled video signals.

Referring to FIG. 3, there is shown a block diagram of a prior known video signal transmission system designated generally as 20. In the system 20 there is provided a headend station 21 and a TV set 22 coupled to the headend station 21 by means of video signal transmission line 23. In the headend station 21 there is provided an amplitude modulator 24. In the TV set 22 there is provided an amplitude demodulator 25.

Figure 6:
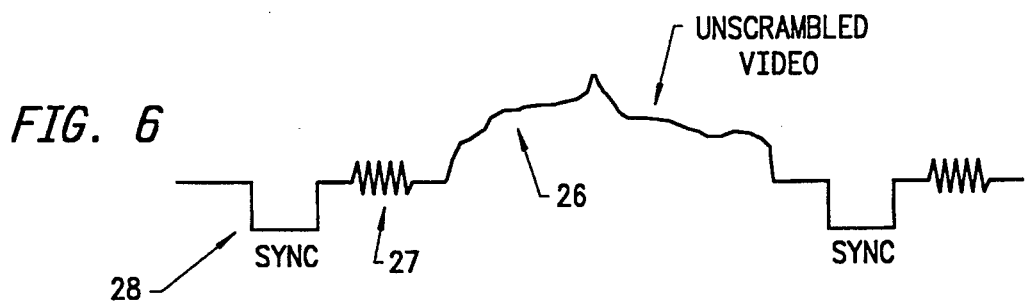
FIG. 6 is a simplified diagram of an unscrambled video signal comprising a sync pulse.

Referring to FIG. 6, there is shown a typical baseband video signal designated generally as 26. The signal 26 comprises video information, control signals, e.g. a color burst signal 27, and a sync pulse 28. The sync pulse 28 is provided for use by the TV set 22 for synchronizing the horizontal and vertical sweeps in the TV set to the source of the video signal.

Figure 7:
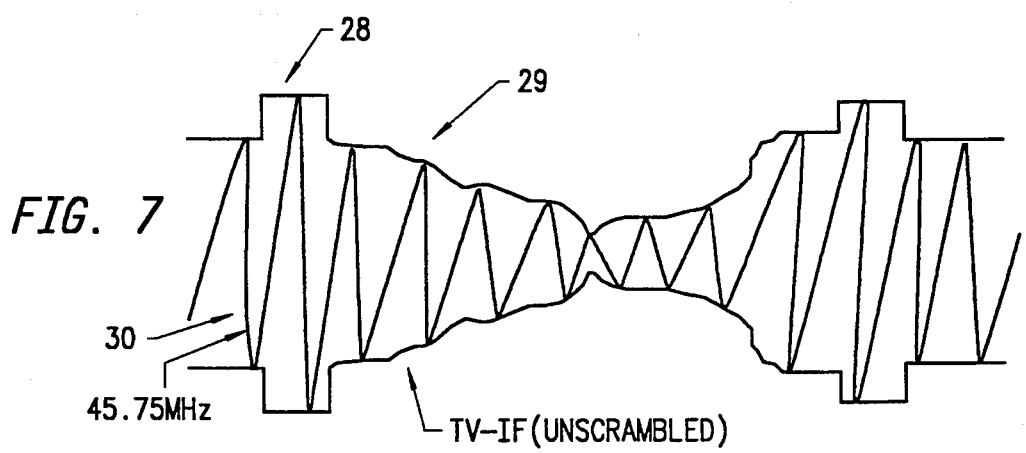
FIG. 7 is a simplified diagram of an amplitude modulated unscrambled video signal.

Referring to FIG. 7, there is shown an amplitude modulated video signal designated generally as 29. In practice the video signal 26 of FIG. 6 is used for modulating the amplitude of a carrier signal 30 having a predetermined frequency, e.g. 45.75 megahertz (MHz). As can be seen in FIG. 7, the sync pulse 28 is preserved in the amplitude modulated signal 29.

Referring again to FIG. 3, in operation the video signal 26 is input to the AM modulator 24 in the headend station 21. In the AM modulator 24 the video signal 26 modulates the amplitude of the carrier 30 producing the modulated video signal 29. The amplitude modulated video signal is then transmitted to the amplitude demodulator 25 in the TV set 22 wherein the signal is demodulated providing a video baseband for use in the television sync and video circuits.

Figure 4:
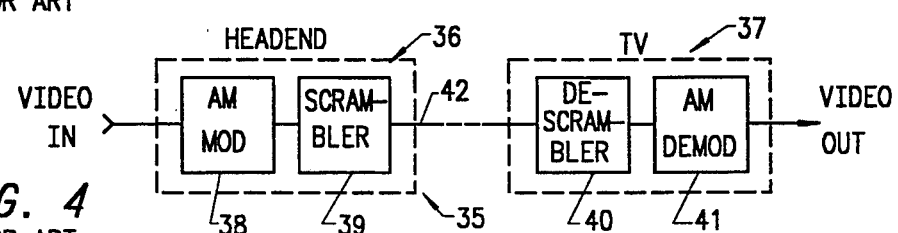
FIG. 4 is a simplified block diagram of a video signal transmission system for transmitting scrambled video signals.

Referring to FIG. 4, there is provided a video signal transmission system designated generally as 35 which is used for transmitting scrambled amplitude modulated video signals. In the system 35 there is provided a headend station 36 and a TV set 37. In the headend station 36 there is provided an amplitude modulator 38 and a scrambler 39. In the TV set 37 there is provided a descrambler 40 and an amplitude demodulator 41. The TV set 37 is coupled to the headend station 36 as by fiber optic, coaxial and/or microwave transmission line 42.

Figure 8:
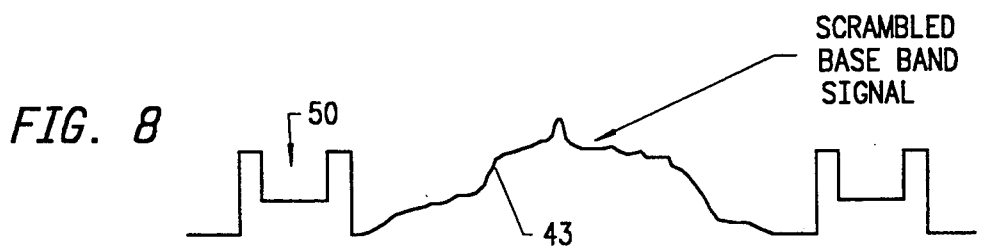
FIG. 8 is a simplified diagram of a scrambled baseband video signal.
Figure 9:
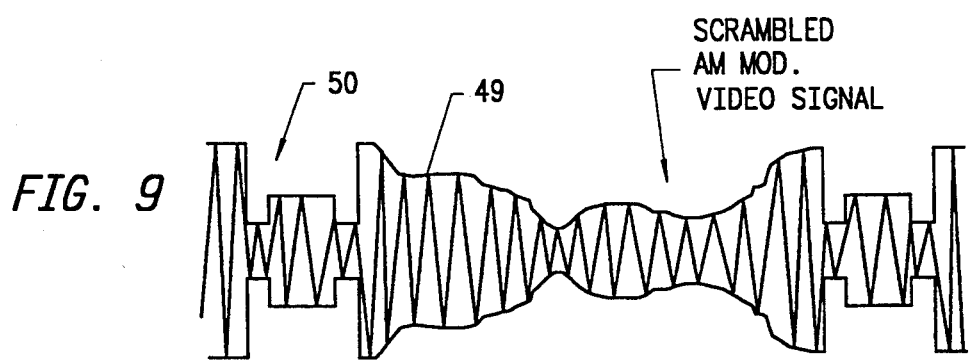
FIG. 9 is a simplified diagram of a scrambled amplitude modulated video signal.

In operation, an unscrambled video signal such as video signal 26 of FIG. 6 is provided to the input of the amplitude modulator 38. The output of the amplitude modulator 38, such as amplitude modulated video signal 29 of FIG. 7, is provided to the input of the scrambler 39. In the scrambler 39 the sync pulse 28 is suppressed as shown by the waveform 43 of FIG. 8, producing an amplitude modulated scrambled video signal 49 having a suppressed or scrambled sync pulse 50 as shown in FIG. 9. The scrambled sync pulse 50 in the wave forms 43 and 49 cannot be detected and processed by conventional sync circuits in the TV set 37, thus requiring the use of the descrambler 40.

The scrambled amplitude modulated video signals are therefore transmitted to the input of the descrambler 40 in the TV set 37. After the descrambling is removed, restoring the conventional sync pulse, the signal is transmitted to the amplitude demodulator 41 for providing the video signal to the remainder of the television video circuits.

Figure 5:
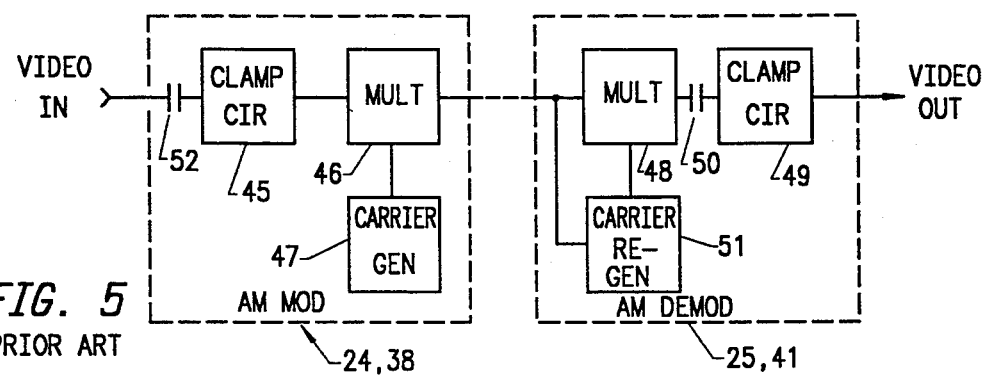
FIG. 5 is a simplified block diagram of an amplitude modulator and an amplitude demodulator.

Referring to FIG. 5, there is provided a block diagram of a typical amplitude modulator and demodulator such as used in the apparatus of FIGS. 3 and 4. As shown in FIG. 5, there is provided in the amplitude modulators 24, 38 a clamping circuit 45, a multiplier 46 and a carrier generator 47. In the amplitude demodulators 25, 41 there is provided a multiplier 48, a clamp circuit 49 coupled to the multiplier 48 through a capacitor 50 and a carrier regenerator 51.

In operation the video signal, such as signal 26 of FIG. 6, is coupled to the clamp circuit 45 by means of a capacitor 52. The output of clamp circuit 45 modulates the output of the carrier generator 47 in the multiplier 46 providing a TV-IF unscrambled video signal, such as video signal 29 of FIG. 7. In the demodulators 25, 41 the unscrambled video signal is combined with the output of the carrier regenerator 51 in the multiplier 48 and provided through the capacitor 50 to the clamp circuit 49 for providing on the output thereof the demodulated video signal.

Figure 10:
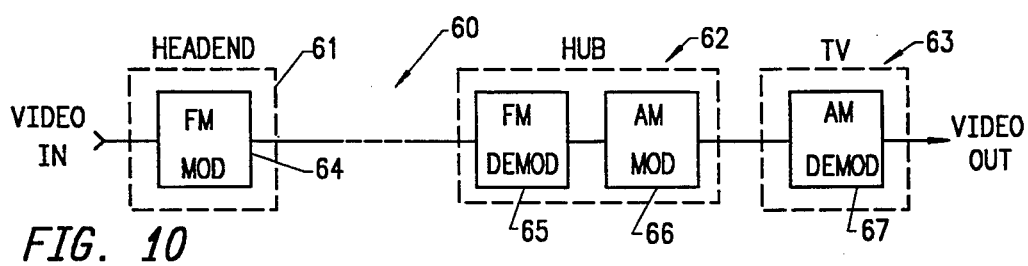
FIG. 10 is a simplified block diagram of a prior known video signal transmission system for transmitting frequency modulated video signals.

Referring to FIG. 10, there is provided a television video signal transmission system designated generally as 60 which is used for transmitting frequency modulated video signals from a headend station 61 to a hub station 62 and then to a television set 63. The transmission of frequency modulated video signals in the system 60 is provided to compensate for the reduced signal-to-noise ratio of conventional amplitude modulated video signals when the transmission lines exceed 5-10 kilometers in length. In the headend station 61 there is provided an FM modulator 64. In the hub station 62 there is provided an FM demodulator 65 and an amplitude modulator 66. In the television set 63 there is provided an amplitude demodulator 67.

In operation, an unscrambled video signal, such as signal 26 of FIG. 6, is provided to the input of the FM modulator 64. The frequency modulated output from the FM modulator 64 is then transmitted to the hub station 62. In the hub station 62 the FM modulated video signal is demodulated in the FM demodulator 65, restoring the baseband video signal input to the FM modulator 64. However, as indicated above, conventional TV sets are only responsive to amplitude modulated video signals. For this reason, the baseband video signal at the output of the FM demodulator 65 is amplitude modulated before being transmitted to the amplitude demodulators 67 in the television set 63 coupled thereto. As in the case of the systems of FIGS. 3 and 4, the lines connecting the headend station hub and TV may comprise fiber optic, coaxial and/or microwave transmission lines.

Figure 11:
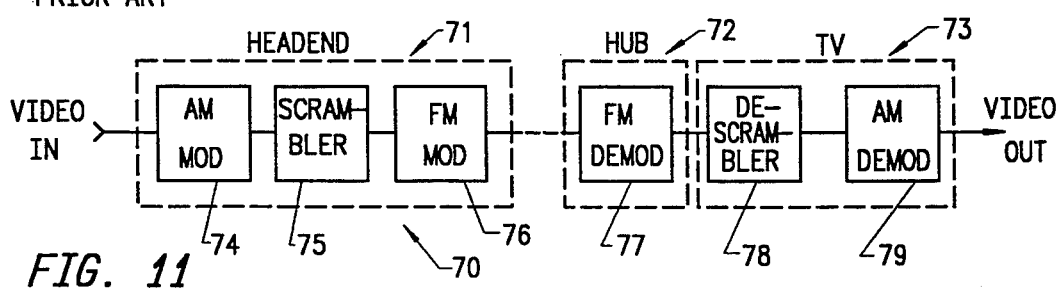
FIG. 11 is a prior known video signal transmission system for transmitting scrambled frequency modulated video signals.

Referring to FIG. 11, there is shown a block diagram of a television video transmission system designated generally as 70 for transmitting scrambled FM modulated video signals. In the system 70 there is provided a headend station 71, a hub 72, and a TV set 73. In the headend station 71 there is provided an amplitude modulator 74, a scrambler 75, and an FM modulator 76. In the hub station 72 there is provided an FM demodulator 77. In the TV set 73 there is provided a descrambler 78 and AM demodulator 79. As described above with respect to the systems of FIGS. 3, 4 and 10 the headend station 71, hub 72 and TV set 73 are coupled by means of fiber optic, coaxial and/or microwave transmission lines.

In the operation of the system 70, the baseband video signals such as signal 26 of FIG. 6 is input to the AM modulator 74. The resulting amplitude modulated signal is thereafter scrambled in the scrambler 75 suppressing the sync signal as described above with respect to FIGS. 8 and 9. The scrambled amplitude modulated video signal is thereafter frequency modulated in the frequency modulator 76 and transmitted to the hub station 72.

In the hub station 72 the frequency modulated scrambled amplitude modulated signal is demodulated removing the FM modulation. The output of the FM demodulator is then transmitted to the descrambler 78 in the TV set 73. The output of the descrambler 78 is then provided to an amplitude demodulator for removing the amplitude modulation and restoring the original unscrambled video baseband signal for use in the remainder of the video circuits in the TV set. As described above, the FM modulation of a scrambled AM modulated video signal actually comprises a modulation within a modulation providing a video signal transmission which still suffers from reduced signal-to-noise ratios.

Referring to FIG. 12, there is provided in accordance with the present invention a unique scrambled frequency modulated video signal transmission system designated generally as 80. In the system 80 there is provided a headend station 81, a hub station 82 and a TV set 83. In the headend station 81 there is provided an amplitude modulator 91, a scrambler 92, a d.c. coupled amplitude demodulator 93, a frequency splitter 94, a sub-carrier modulator 95, a signal combining circuit 96 and an FM modulator 97.

The circuits 91-97 are provided for generating a scrambled frequency modulated video signal on a transmission line 98 coupled to the hub station 82 by means of a fiber optic, coaxial and/or microwave transmission line as described above.

In the hub station 82, the transmission line 98 is coupled to an FM demodulator 100, a sub-carrier demodulator 101, a signal combining circuit 102 and a d.c. coupled amplitude modulator 103. The signals from the circuits 100-103 in the hub 82 are typically transmitted to the TV set 83 by means of a coaxial transmission line 84.

In the TV set 83 there is provided a descrambler 104 and an amplitude demodulator 105.

The circuits 100-105 are provided for restoring on an output line 106 the original baseband unscrambled video signal supplied to the amplitude modulator 91 in the headend station 80 by means of a line 107.

Referring to FIG. 13, there is provided in the d.c. coupled amplitude demodulator 93 a multiplier 110 and a carrier regenerating circuit 111. The inputs of the multiplier 110 and the carrier regenerating circuit 111 are coupled to the scrambler 92 by means of a signal transmission line 112. The output of the multiplier 110 is coupled to the frequency splitter 94 by means of a signal transmission line 113.

Referring to FIG. 14, there is provided in the amplitude modulator 103 a multiplier 115 and a carrier generating circuit 116. The input to the multiplier 115 is coupled to the signal combining circuit 102 by means of a signal transmission line 117. The output of the multiplier is coupled to the descrambler 104 by means of the signal transmission line 84.

Figure 15:
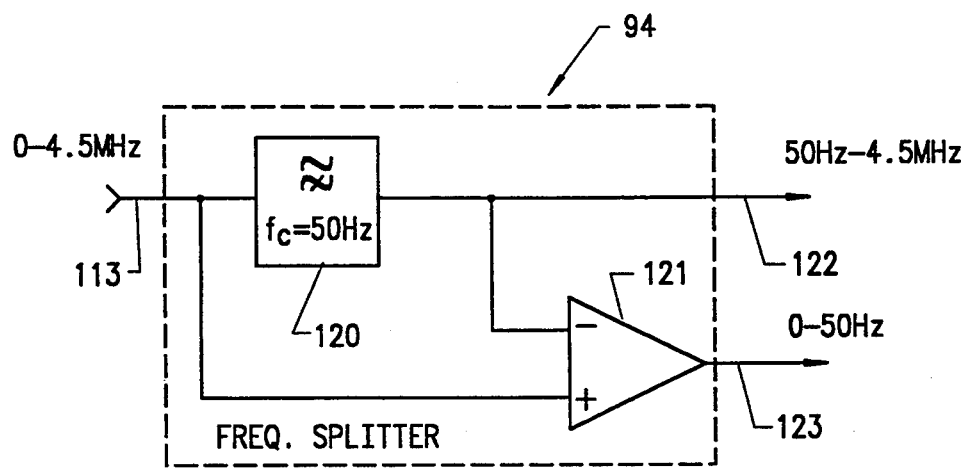
FIG. 15 is a block diagram of a frequency splitter according to the present invention.

Referring to FIG. 15, there is provided in the frequency splitter 94 a high pass filter 120 and an operational amplifier 121 having complimentary negative and positive inputs. The input to the filter 120 and the positive input to the amplifier 121 are coupled to the output of the amplitude demodulator 93 by means of the transmission line 113. The output of the filter 120 is coupled to the negative input of the amplifier 121 and to one input of the signal combining circuit 96 by means of a transmission line 122. The output of the amplifier 121 is coupled to the input of the sub-carrier modulator 95 by means of a transmission line 123.

In operation, the output of the amplitude demodulator 93 having a bandwidth of from 0 to 4.5 MHz is transmitted to the input of the filter 120 and the positive input of the amplifier 121. The high pass filter 120 which is provided with a frequency cut-off $f_c$ of 50 Hz passes the higher frequencies 50 Hz to 4.5 MHz. These frequencies are then subtracted in the amplifier 121 from the 0-4.5 MHz signal applied to the positive input thereof, producing on the output thereof a signal having a bandwidth of 0-50 Hz.

Figure 16:
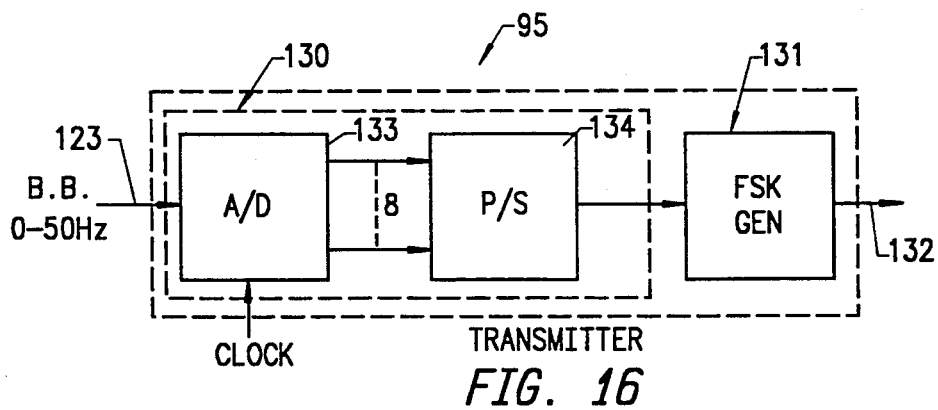
FIG. 16 is a block diagram of a subcarrier modulator for providing a pulse-code FSK modulated subcarrier signal according to the present invention.

Referring to FIG. 16, there is provided in the sub-carrier modulator 95 a pulse-code modulator 130 comprising an analog-to-digital (A/D) converter 133, a parallel-to-serial (P/S) converter 134 and a 6.75 MHz frequency shift keying (FSK) generator 131. The input to the pulse-code modulator 130 is coupled as described above to the output of the frequency splitter 94 by means of the transmission line 123. The output of the generator 131 is coupled to a second input of the signal combining circuit 96 by means of a transmission line 132.

Figure 17:
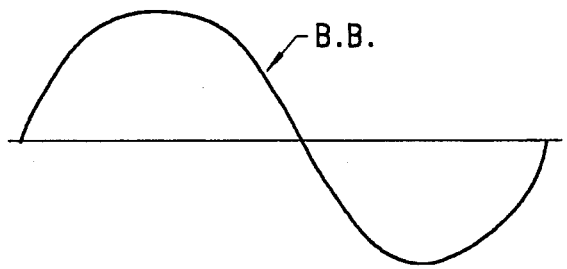
FIG. 17 is a diagram of a low frequency, e.g. 0–50 Hz, sine wave representing the analog scrambled baseband video signal applied to an input of the subcarrier modulator of FIG. 16.
Figure 18:
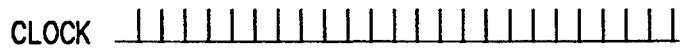
FIG. 18 is a diagram of clock pulses used in the analog-to-digital (A/D) converter of the modulator of FIG. 16.
Figure 19:
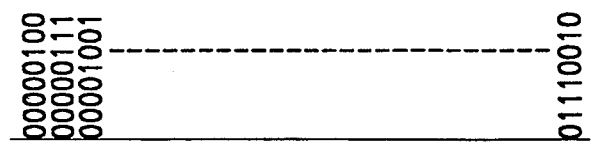
FIG. 19 is a diagram of logical "1's" and "0's" representing the digital output of the A/D converter of FIG. 16.

Referring to FIGS. 17-19, in operation the low frequency 0-50 Hz baseband signals on the line 123 which contain the scrambled sync pulse information from the output of the AM demodulator 93, as represented by the sine wave B.B. in FIG. 17, are converted in A/D converter 133 in response to the sampling clock as shown in FIG. 18 to provide a digital signal (e.g. 8 parallel bits as represented by the logical "1"s and "0's" in FIG. 19) to P/S converter 134. The serial digital output of P/S converter 134 is then used to modulate the carrier signal provided by the FSK generator 131 to provide a 6.75 MHz FSK sub-carrier signal comprising PCM data and clock information on the transmission line 132.

Figure 20:
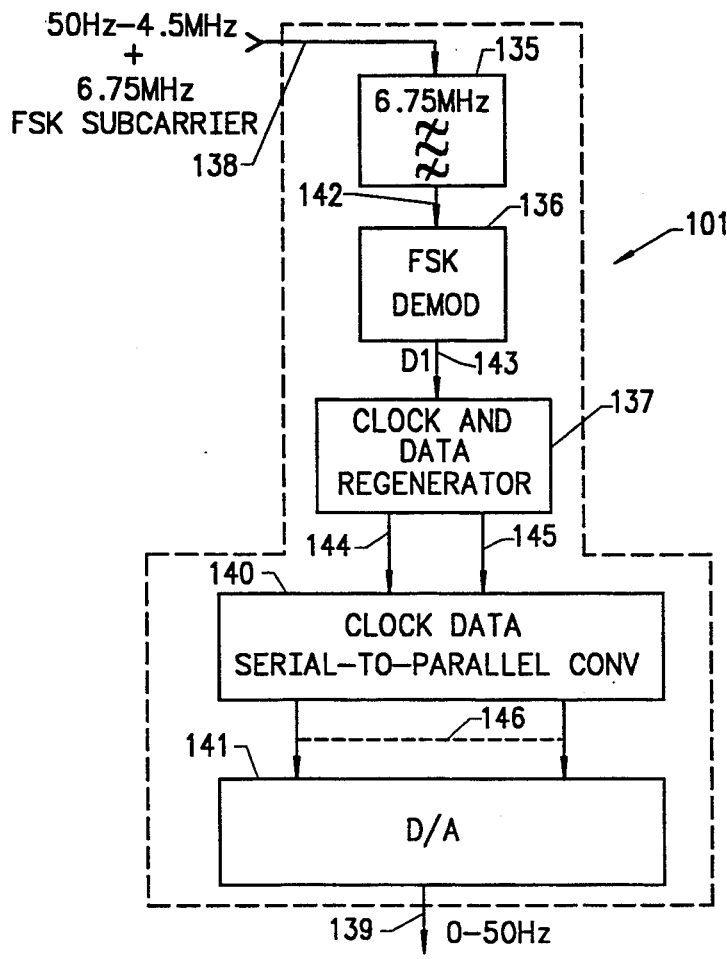
FIG. 20 is a block diagram of a subcarrier demodulator according to the present invention.

Referring to FIG. 20, there is provided in the subcarrier demodulator 101 a 6.75 MHz bandpass filter 135, an FSK demodulator 136, a clock and data regenerator 137, a serial-to-parallel (S/P) converter 140 and a digital-to-analog converter 141. The input to the bandpass filter 135 is coupled to the output of the FM demodulator 100 by means of a transmission line 138. The output of the filter 135 is coupled to the FSK demodulator by a signal line 142. The demodulator 136 is coupled to the clock and data regenerator 137 by a signal line 143. Clock and data outputs from regenerator 137 are coupled to the S/P converter 140 by signal lines 144 and 145. The parallel outputs of the S/P converter 140 are coupled to the D/A converter 141 by lines 146. The output of the D/A converter 141 is coupled to one input of signal combining circuit 102 by means of transmission line 139.

Figure 21:
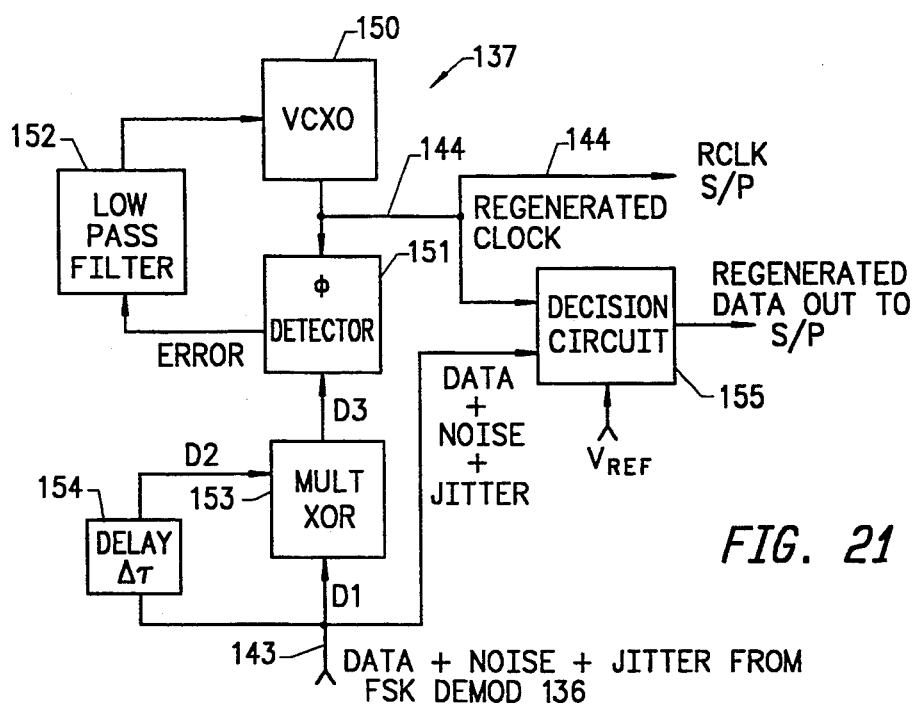
FIG. 21 is a block diagram of a clock and data regeneration circuit according to the present invention.
Figure 22:
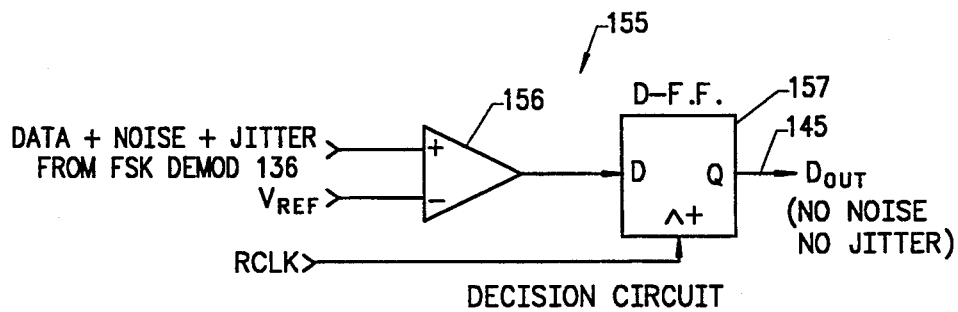
FIG. 22 is a block diagram of a decision circuit in the apparatus of FIG. 21 according to the present invention.

Referring to FIGS. 21 and 22, the clock and data regenerator 137 comprises a voltage controlled crystal oscillator (VCXO) 150, a phase detector 151, a low pass filter 152, a multiplier, i.e. exclusive OR circuit, 153, a delay circuit 154 and a decision circuit 155. The decision circuit 155 comprises a differential amplifier 156 and a D flip-flop 157.

Figure 23:
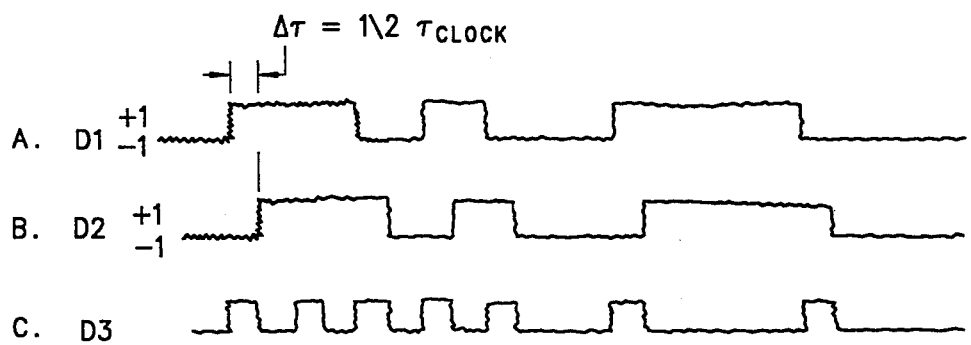
FIG. 23 parts A, B, C are representations of three signals D1, D2 and D3 in the circuit of FIG. 21.

Referring to FIG. 23A, the output of the FSK demodulator 136 comprises a pulse-code modulated (PCM) signal D1 corresponding to the output of the P/S converter 134 in the subcarrier modulator 95. The PCM signal D1, as indicated above, comprises both data and clock information. However, the video transmission link and the transmission of the PCM signal therein is found to add noise and jitter components to the PCM signal. The noise component is characterized by unpredictable variations in the amplitude of the PCM signal and the jitter component is characterized by unpredictable temporal variations in the duration of the pulses in the PCM signal. These components appear as irregularities in the envelope of the pulses as shown in FIG. 23A.

To obtain the clock information from the PCM signal D1, the signal D1 is supplied to the exclusive OR circuit 153 and the delay circuit 154. The delay circuit 154 delays signal D1 approximately one half a clock period, providing a delayed signal D2 as shown in FIG. 23B. In the exclusive OR circuit 153, the signals D1 and D2 are processed, i.e. exclusively OR'd, to provide the clock pulses D3 as shown in FIG. 23C. The phase of the clock pules D3 are then compared with the output of the VCXO 150 in the phase detector 151 to control the output of the VCXO 150 to produce a regenerated noise and jitter free clock (RCLK) on the line 144 as shown in FIG. 24B.

Figure 24:
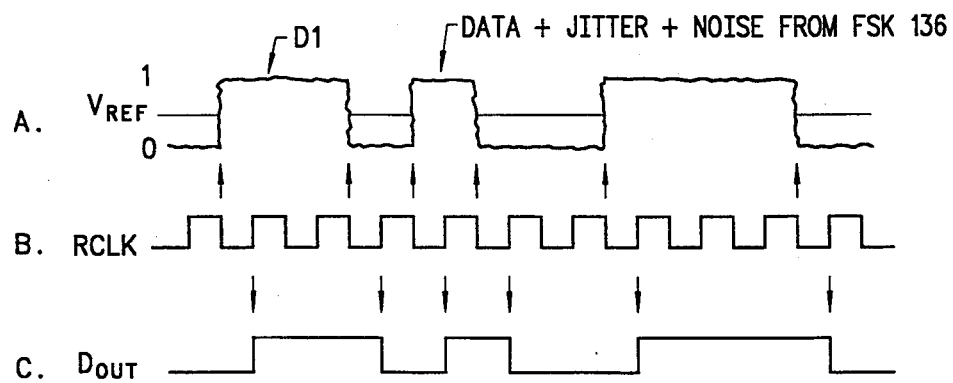
FIG. 24 parts A, B, C are representations of signal D1, a regenerated clock and a regenerated data signal in the circuit of FIG. 21.

Referring to FIGS. 22 and 24, the PCM signal D1 and a reference potential $V_{REF}$ are supplied to the inputs of the differential amplifier 156. The output of the amplifier 156 is supplied to the data input D of the D flip-flop 157 wherein it is clocked to the output Q thereof, i.e. line 145, on the rising edge of the clock RCLK. In practice, the missing clock pulses in the output of the exclusive OR circuit 151 due to the nature of the pulse code modulation and demodulation are supplied by the VCXO 150 as shown in FIG. 24B. It will also be noted that the transitions in the PCM signal D1 occur on the falling edge of clock RCLK while the transitions of the data output ($D_{OUT}$) of the decision circuit 157 occur on the rising edge of the clock RCLK. Because the differential amplifier eliminates most of the amplitude noise from signal D1 and the flip-flop 157 removes the jitter, the data output signal $D_{OUT}$ on the line 145 is noise and jitter free.

The regenerated clock RCLK on the line 144 and the regenerated data on the line 145 are then provided to the serial-to-parallel converter 140 for converting the data from serial to parallel data. The parallel data is then converted in D/A converter 141 from digital to analog data and provided to the output of the subcarrier demodulator 101 on the line 139.

Referring again to FIG. 12, the operation of scrambled frequency modulated video signal transmission system 80 may be summarized as follows. An unscrambled video baseband signal such as signal 26 of FIG. 6 is supplied to the video input transmission line 107 coupled to the input of the amplitude modulator 91. The baseband signal is amplitude modulated and applied to the input of the scrambler 92. In the scrambler 92 the sync pulse information in the baseband video signal is scrambled for providing a scrambled amplitude modulated video signal such as signal 49 in FIG. 9. The output of the scrambler is then applied to the d.c. coupled amplitude demodulator 93. The amplitude demodulator 93 removes the 45.75 MHz carrier, providing on the transmission line 113 a signal which may be identified as a scrambled baseband signal. The scrambled baseband signal is then applied to the frequency splitter 94. The frequency splitter 94 separates the low frequency components of the scrambled baseband video signal 0–50 Hz from the high frequency components thereof, i.e. the 50 Hz–4.5 MHz components. The 0–50 Hz components are then used to provide a pulse-code FSK modulated 6.75 MHz carrier in the sub-carrier modulator 95. The output of the subcarrier modulator 95 and the high frequency components, 50 Hz to 4.5 MHz, are then combined in the signal combining circuit 96 to provide an output comprising the 50 Hz −4.5 MHz signal and the 6.75 MHz pulse-code FSK modulated subcarrier. The combined signal is then frequency modulated in the frequency modulator 97 for transmission on the transmission line 98.

In the FM demodulator 100, the FM carrier signal is removed from the signal received from the FM modulator 97. The output of the FM demodulator 100 is then applied to the subcarrier demodulator 101 and a second input of the combining circuit 102. In the subcarrier demodulator 101 the pulse-code FSK modulated subcarrier is removed, restoring the scrambled sync pulse information. This information is then combined in the signal combining circuit 102 with the output from the frequency demodulator 100. The output of the signal combining circuit 102 is then modulated in the d.c. coupled amplitude modulator 103 and transmitted to the TV set 83.

In the TV set 83, the resulting amplitude modulated signal is then descrambled in the descrambling circuit 104 for providing an unscrambled video signal such as video signal 29 of FIG. 7. The unscrambled video signal from the descrambler 104 is then amplitude demodulated in the amplitude demodulator 105 for restoring on the transmission line 106 the baseband video signal originally provided on the input to the amplitude modulator 91 on the transmission line 107.

Unlike the amplitude modulator 91 and amplitude demodulator 105, the d.c. coupled amplitude modulator 103 and the d.c. coupled amplitude demodulator 93 of the present invention do not include the capacitors 52 and 50 nor the clamping circuits 45 and 49 described above with respect to the circuits of FIG. 5. The omission of the capacitors and the clamping circuits from the modulator 103 and demodulator 93 preserves the sync pulse information in the low frequency components 0–50 Hz of the video signal.

From the foregoing it also will be appreciated that by removing the amplitude modulation from, and pulse-code and FSK modulating the sync pulse information in the scrambled video signal before it is frequency modulated, the resulting signal can be frequency modulated and transmitted with a high signal-to-noise ratio and no loss of sync pulse information as would otherwise occur in an a.c. coupled FM system. Moreover, the resulting video signal at the receiver is free of link-induced noise and jitter components and therefore stable and of high quality.

While a preferred embodiment of the present invention is described above, it is contemplated that numerous modifications may be made thereto for particular applications without departing from the spirit and scope of the present invention. For example, while described using land lines, the system of the present invention may also employ wireless broadcasting techniques. Accordingly, it is intended that the embodiment described be considered only as illustrative of the present invention and that the scope thereof should not be limited thereto but be determined by reference to the claims hereinafter provided.

We claim:

1. A scrambled FM video signal transmission system comprising:

means responsive to a scrambled amplitude modulated video signal for removing the amplitude modulation therefrom, said removing means providing a scrambled video signal, said scrambled video signal having low and high frequency components therein;

means responsive to said scrambled video signal for separating said low frequency components from said high frequency components therein;

means responsive to said low frequency components for modulating a subcarrier, said subcarrier modulating means providing a pulse-code modulated subcarrier signal;

means responsive to said pulse-code modulated subcarrier signal and said high frequency components in said scrambled video signal for providing a scrambled frequency modulated video signal; and means responsive to said scrambled frequency modulated video signal for restoring said scrambled amplitude modulated video signal.

2. A scrambled FM video signal transmission system according to claim 1 wherein said restoring means comprises:

means responsive to said scrambled frequency modulated video signal for providing a frequency demodulated signal, said frequency demodulated signal comprising said low frequency components;

means responsive to said frequency demodulated signal for separating said low frequency components therefrom; and means for modulating the amplitude of said low frequency components from said low frequency component separating means and said frequency demodulated signal for restoring said scrambled amplitude modulated signal.

3. A scrambled FM video signal transmission system according to claim 1 wherein said low frequency components comprise sync pulse information.

4. A scrambled FM video signal transmission system according to claim 1 wherein said low frequency components comprise approximately 0 to 50 Hz and said high frequency components comprise approximately 50 Hz to 4.5 MHz.

5. A scrambled FM video signal transmission system according to claim 1 wherein said subcarrier comprises a frequency of approximately 6.75 MHz.

6. A scrambled FM video signal transmission system according to claim 1 wherein said frequency separating means comprises a high pass filtering means for providing said high freqency components and means for subtracting said high frequency components from said scrambled video signal for providing said low frequency components.

7. A scrambled FM video signal transmission system according to claim 6 wherein said subtracting means comprises an operational amplifier having a positive and a negative input.

8. A scrambled FM video signal transmission system according to claim 1 wherein said subcarrier modulating means comprises:
  means for converting said low frequency components from an analog signal to a parallel digital signal;
  means for converting said parallel digital signal to a series digital signal; and
  means responsive to said series digital signal for providing a frequency shift keyed subcarrier signal.

9. A scrambled FM video signal transmission system according to claim 8 wherein said subcarrier signal comprises a frequency of 6.75 MHz.

10. A scrambled FM video signal transmission system according to claim 2 wherein said frequency demodulated signal comprises said pulse-code modulated subcarrier signal and said means for separating said low frequency components from said frequency demodulated signal comprises means for demodulating said pulse-code modulated subcarrier signal.

11. A scrambled FM video signal transmission system according to claim 10 wherein said means for demodulating said pulse code modulated subcarrier signal comprises:
  a bandpass filter means responsive to said frequency demodulated signal;
  an FSK demodulator means coupled to the output of said filter means;
  means for regenerating serial digital clock and data signals from the output of said FSK demodulator means;
  means for converting the serial digital clock and data signals to parallel digital clock and data signals; and
  means for converting the parallel digital clock and data signals to analog data signals.

12. A scrambled FM video signal transmission system according to claim 2 wherein said amplitude modulating means comprises d.c. coupled amplitude modulating means.

13. A scrambled FM video signal transmission system according to claim 11 wherein said output of said FSK demodulator means comprises a data signal having noise and jitter components and said means for regenerating serial digital clock and data signals comprises:
  means responsive to said output of said FSK demodulator means for providing a clock and data signal which are free of said noise and jitter components.

14. A scrambled FM video signal transmission system according to claim 11 wherein said output of said FSK demodulator means comprises a data signal having noise and jitter components and said means for regenerating serial digital clock and data signals comprises:
  delay means responsive to said data signal from said FSK demodulator means for providing a delayed data signal;
  exclusive OR circuit means responsive to said data signal and said delayed data signal for providing a first clock signal;
  a phase-locked loop circuit means including a voltage controlled oscillator means, a phase detector and a low pass filter means responsive to said first clock signal for providing a regenerated clock signal; and
  a decision circuit means responsive to said regenerated clock signal and said data signal for providing a regenerated data signal which is free of said noise and said jitter.

15. A scrambled FM video signal transmission system according to claim 14 wherein said decision circuit means comprises:
  a differential amplifier means having a first input for receiving said data signal and a second input for receiving a reference potential; and
  a D flip-flop having a data input for receiving the output of said diffential amplifier means, a clock input for receiving said regenerated clock signal and an output for providing said data signal which is free of said noise and said jitter.

16. A scrambled FM video signal transmission system comprising:
  an amplitude modulator;
  a scrambler coupled to the output of said amplitude modulator;
  an amplitude demodulator coupled to the output of said scrambler;
  a frequency splitter coupled to the output of said amplitude demodulator, said splitter having a first and a second output for providing a first signal having a first frequency range and a second signal having a second frequency range, respectively;
  a sucarrier modulator for providing a pulse-code modulated subcarrier signal coupled to said first output of said splitter;
  a first signal combiner having a first input coupled to said subcarrier modulator and a second input coupled to said second output of said splitter;
  a frequency modulator coupled to the output of said signal combiner;
  a frequency demodulator;
  means for transmitting video signals from said frequency modulator to said frequency demodulator;
  a subcarrier demodulator for demodulating said pulse-code modulated subcarrier signal coupled to said frequency demodulator;
  a second signal combiner having a first input coupled to said subcarrier demodulator and a second input coupled to said frequency demodulator;
  an amplitude modulator coupled to said second signal combiner;
  a descrambler coupled to said amplitude demodulator; and an amplitude demodulator.

17. A system according to claim 16 wherein said amplitude demodulator and said amplitude modulator are d.c. coupled to said scrambler and said second signal combiner, respectively.

18. A system according to claim 16 wherein said amplitude demodulator comprises a multiplier coupled to said scrambler and a carrier regenerator having an input coupled to said scrambler and an output coupled to said multiplier and said amplitude modulator comprises a multiplier coupled to said second signal combiner and a carrier generator coupled to said multiplier.

19. A system according to claim 16 wherein said first frequency range is approximately 0 to 50 Hz and said second frequency range is approximately 50 Hz to 4.5 MHz.

20. A system according to claim 16 wherein said frequency splitter comprises:
a high pass filter coupled to said amplitude demodulator, said filter having an output for providing said second signal;
an operational amplifier having a negative input coupled to said high pass filter, a positive input coupled to said amplitude demodulator and an output for providing said first signal.

21. A system according to claim 16 wherein said subcarrier modulator comprises:
means for converting the first signal from the first output of said splitter from an analog signal to a parallel digital signal;
means for converting said parallel digital signal to a series digital signal; and
means responsive to said series digital signal for providing a frequency shift keyed subcarrier signal.

22. A system according to claim 16 wherein said subcarrier demodulator comprises:
bandpass filter means for filtering the output of said frequency demodulator;
a FSK demodulator means coupled to the output of said filter means;
means for regenerating serial digital clock and data signals from the output of said FSK demodulator means;
means for converting the serial digital clock and data signals to parallel digital clock and data signals; and
means for converting the parallel digital clock and data signals to analog data signals.

23. A system according to claim 22 wherein said output of said FSK demodulator means comprises a data signal having noise and jitter components and said means for regenerating serial digital clock and data signals comprises:
delay means responsive to said data signal from said FSK demodulator means for providing a delayed data signal;
exclusive OR circuit means responsive to said data signal and said delayed data signal for providing a first clock signal;
a phase-locked loop circuit means including a voltage controlled oscillator means, a phase detector and a low pass filter means responsive to said first clock signal for providing a regenerated clock signal; and
a decision circuit means responsive to said regenerated clock signal and said data signal for providing a regenerated data signal which is free of said noise and said jitter components.

24. A scrambled FM video signal transmission system according to claim 22 wherein said decision circuit means comprises:
a differential amplifier means having a first input for receiving said data signal and a second input for receiving a reference potential; and
a D flip-flop having a data input for receiving the output of said differential amplifier means, a clock input for receiving said regenerated clock signal and an output for providing said data signal which is free of said noise and said jitter.

25. A scrambled FM video signal transmission system comprising:
means responsive to a baseband video signal for modulating the amplitude of a first carrier signal, said first carrier signal modulating means having an output for providing a first amplitude modulated signal;
means responsive to said first amplitude modulated signal for scrambling said first amplitude modulated signal, said scrambling means having an output for providing a scrambled first amplitude modulated signal;
means responsive to said scrambled first amplitude modulated signal for removing said first carrier signal from said scrambled first amplitude modulated signal, said first carrier signal removing means having an output for providing a scrambled baseband video signal;
means responsive to said scrambled baseband video signal for splitting the frequencies in said scrambled baseband video signal, said frequency splitting means having a first output for providing a first signal having a first range of frequencies and a second output for providing a second signal having a second range of frequencies;
means responsive to said first signal for pulse-code modulating a second carrier signal, said second carrier modulating means having an output for providing a pulse-code modulated subcarrier signal;
means responsive to said pulse-code modulated subcarrier signal and said second output of said frequency splitting means for combining said pulse-code modulated subcarrier signal and said second signal from said second output of said frequency splitting means, said combining means having an output for providing a first combined output signal;
means responsive to said first combined output signal for modulating the frequency of a third carrier signal, said frequency modulating means having an output for providing a scrambled frequency modulated video signal;
means responsive to said scrambled frequency modulated video signal for removing said third carrier signal from said scrambled frequency modulated video signal, said third carrier signal removing means having an output for providing a frequency demodulated output signal;
means responsive to said frequency demodulated output signal for removing said second carrier signal from said frequency demodulated output signal, said second carrier removing means including pulse-code demodulating means for restoring said first signal having said first frequency range;
means responsive to said restored first signal from said output of said second carrier removing means and said frequency demodulated output signal for combining said restored first signal from said second carrier removing means and said frequency demodulated output signal from said second carrier removing means for providing a second combined output signal;

means responsive to said second combined output signal for modulating the amplitude of a fourth carrier signal, said fourth carrier signal modulating means having an output for restoring said scrambled amplitude modulated video signal;

means responsive to said restored scrambled amplitude modulated video signal from said fourth carrier signal amplitude modulating means for descrambling said restored scrambled amplitude modulated video signal, said descrambling means having an output for restoring said amplitude modulated video signal; and means responsive to said restored amplitude modulated video signal for removing said fourth carrier signal, said fourth carrier signal removing means having an output for restoring said baseband video signal.

26. A system according to claim 25 wherein said first carrier removing means and said fourth carrier amplitude modulating means are d.c. coupled to said scrambling means and said combining means for providing said second combined output signal, respectively.

27. A system according to claim 25 wherein said first carrier signal removing means comprises a multiplying means coupled to said scrambling means and a first carrier signal regenerating means having an input coupled to said scrambling means and an output coupled to said multiplying means and said fourth carrier amplitude modulating means comprises a multiplying means coupled to said combining means for providing said second combined output signal and a fourth carrier signal generating means coupled to said multiplying means.

28. A system according to claim 25 wherein said first frequency range is approximately 0 to 50 Hz and said second frequency range is approximately 50 to 4.5 MHz.

29. A system according to claim 25 wherein said frequency splitting means comprises:

a high pass filter means coupled to said first carrier signal removing means, said filter means having an output for providing said second signal having said second range of frequencies; and an operational amplifying means having a negative input coupled to said high pass filter means, a positive input coupled to said first carrier signal removing means and an output for providing said first signal.

30. A system according to claim 25 wherein said means for pulse-code modulating said second carrier signal comprises:

means for converting the first signal from the first output of said frequency splitting means from an analog signal to a parallel digital signal;

means for converting said parallel digital signal to a series digital signal; and means responsive to said series digital signal for providing a frequency shift keyed subcarrier signal.

31. A system according to claim 25 wherein said second carrier removing means comprises:

bandpass filter means for filtering said frequency demodulated output signal; a FSK demodulator means coupled to the output of said filter means;

means for regenerating serial digital clock and data signals from the output of said FSK demodulator means;

means for converting the serial digital clock and data signals to parallel digital clock and data signals; and means for converting the parallel digital clock and data signals to analog data signals.

32. A system according to claim 31 wherein said output of said FSK demodulator means comprises a data signal having noise and jitter components and said means for regenerating serial digital clock and data signals comprises:

delay means responsive to said data signal from said FSK demodulator means for providing a delayed data signal;

exclusive OR circuit means responsive to said data signal and said delayed data signal for providing a first clock signal;

a phase-locked loop circuit means including a voltage controlled oscillator means, a phase detector and a low pass filter means responsive to said first clock signal for providing a regenerated clock signal; and a decision circuit means responsive to said regenerated clock signal and said data signal for providing a regenerated data signal which is free of said noise and said jitter.

33. A scrambled FM video signal transmission system according to claim 32 wherein said decision circuit means comprises:

a differential amplifier means having a first input for receiving said data signal and a second input for receiving a reference potential; and a D flip-flop having a data input for receiving the output of said diffential amplifier means, a clock input for receiving said regenerated clock signal and an output for providing said data signal which is free of said noise and said jitter.

34. A method of transmitting a scrambled FM video signal comprising the steps of:

removing the amplitude modulation from a scrambled amplitude modulated video signal for providing a scrambled video signal, said scrambled video signal having low and high frequency components therein;

separating said low frequency components from said high frequency components in said scrambled video signal;

pulse-code modulating a subcarrier in response to said low frequency components for providing a pulse-code modulated subcarrier signal;

providing in response to said pulse-code modulated subcarrier signal and said high frequency components in said scrambled video signal a scrambled frequency modulated video signal; and restoring in response to said scrambled frequency modulated video signal said scrambled amplitude modulated video signal.

35. A method according to claim 34 wherein said restoring step comprises the steps of:

providing in response to said scrambled frequency modulated video signal a frequency demodulated signal, said frequency demodulated signal comprising said low frequency components;

separating in response to said frequency demodulated signal said low frequency components therefrom; and modulating the amplitude of said low frequency components and said frequency demodulated signal for restoring said scrambled amplitude modulated signal.

36. A method according to claim 34 wherein said low frequency components comprise sync pulse information.

37. A method according to claim 34 wherein said low frequency components comprise approximately 0 to 50 Hz and said high frequency components comprise approximately 50 Hz to 4.5 MHz.

38. A method according to claim 34 wherein said subcarrier comprises a frequency of approximately 6.75 MHz.

39. A method according to claim 34 wherein said frequency separating step comprises filtering the high frequency components from said scrambled video signal and subtracting said high frequency components from said scrambled video signal for providing said low frequency components.

40. A method according to claim 39 wherein said subtracting step comprises applying said high frequency components and said scrambled video signal to an operational amplifier having a positive and a negative input.

41. A method according to claim 34 wherein said step of pulse-code modulating a subcarrier signal comprises the steps of:
converting said low frequency components from analog signals to digital signals;
converting said digital signals from parallel digital signals to serial digital signals; and
generating in response to said serial digital signals a corresponding frequency shift keyed sub-carrier signal.

42. A method according to claim 41 wherein said subcarrier signal comprises a frequency of 6.75 MHz.

43. A method according to claim 35 wherein said frequency demodulated signal comprises said pulse-code modulated subcarrier signal and said step of separating said low frequency components from said frequency demodulated signal comprises the step of demodulating said pulse-code modulated subcarrier signal.

44. A method according to claim 43 wherein said step of separating said low frequency components from said frequency demodulated signal comprises the step of separating said subcarrier signal from said frequency demodulated signal by means of a bandpass filter and said step of demodulating said pulse-code modulated subcarrier signal comprises the steps of:
demodulating said subcarrier signal in a FSK demodulator;
regenerating digital clock and data signals from the output of the FSK demodulator;
converting the digital clock and data signals from serial digital clock and data signals to parallel clock and data signals; and
converting the parallel clock and data signals to analog data signals.

45. A method according to claim 44 wherein the output of the FSK demodulator comprises a data signal having noise and jitter components and said step of regenerating digital clock and data signals from the output of the FSK demodulator comprises the steps of:
delaying the data signal from the FSK demodulator for providing a delayed data signal;
combining the data signal from the FSK demodulator and the delayed data signal in an exclusive OR circuit for providing a first clock signal;
controlling the frequency of a voltage controlled oscillator in a phase-locked loop with the first clock signal for providing a regenerated clock signal; and
applying the regenerated clock and the data signal from the FSK demodulator to a decision circuit for providing a regenerated data signal which is free of said noise and jitter components.

46. A method according to claim 45 wherein the step of applying the regenerated clock and the data signal from the FSK demodulator to a decision circuit comprises the steps of:
applying the data signal from the FSK demodulator and a voltage reference signal to the first and second inputs of a differential amplifying means; and
applying the output of the differential amplifying means and the regenerated clock to the data and clock inputs of a D flip-flop for providing said data signal which is free of said noise and jitter components.

47. A method according to claim 35 wherein said amplitude modulating step comprises the step of using d.c. coupled amplitude modulating means.

* * * * *

UNITED STATES PATENT AND TRADEMARK OFFICE
CERTIFICATE OF CORRECTION

PATENT NO. : 5,402,489
DATED : March 28, 1995
INVENTOR(S) : Gysel, et al.

It is certified that error appears in the above-indentified patent and that said Letters Patent is hereby corrected as shown below:

Claim 15, column 12, line 32, delete "diffential" and substitute therefor --differential--

Claim 16, column 12, line 48, delete "sucarrier" and substitute therefor --subcarrier--

Claim 33, column 16, line 34, delete "diffential" and substitute therefor --differential--

Signed and Sealed this

Twenty-fourth Day of October, 1995

BRUCE LEHMAN

Attest:

Attesting Officer

Commissioner of Patents and Trademarks